(12) United States Patent  
Gerard et al.

(10) Patent No.: US 9,311,300 B2  
(45) Date of Patent: Apr. 12, 2016

(54) USING NATURAL LANGUAGE PROCESSING (NLP) TO CREATE SUBJECT MATTER SYNONYMS FROM DEFINITIONS

(71) Applicant: International Business Machines Corporation, Armonk, NY (US)

(72) Inventors: Scott N. Gerard, Wake Forest, NC (US); Mark G. Megerian, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 14/026,264

(22) Filed: Sep. 13, 2013

(65) Prior Publication Data

US 2015/0081276 A1    Mar. 19, 2015

(51) Int. Cl.
| | |
|---|---|
| *G06F 17/30* | (2006.01) |
| *G06F 7/00* | (2006.01) |
| *G06F 17/28* | (2006.01) |
| *G06F 17/27* | (2006.01) |

(52) U.S. Cl.
  CPC .............. *G06F 17/28* (2013.01); *G06F 17/277* (2013.01); *G06F 17/2735* (2013.01); *G06F 17/2795* (2013.01); *G06F 17/30699* (2013.01); *G06F 17/30864* (2013.01); *G06F 17/30867* (2013.01)

(58) Field of Classification Search
  USPC ......................................................... 707/722
  See application file for complete search history.

(56) References Cited

U.S. PATENT DOCUMENTS

| | | |
|---|---|---|
| 6,556,964 B2 | 4/2003 | Haug et al. |
| 7,177,879 B2 | 2/2007 | Flank et al. |
| 7,330,811 B2 | 2/2008 | Turcato et al. |
| 7,496,593 B2 | 2/2009 | Gardner et al. |
| 7,890,521 B1 | 2/2011 | Grushetskyy et al. |

(Continued)

FOREIGN PATENT DOCUMENTS

| | | |
|---|---|---|
| CN | 101763405 A | 6/2010 |
| JP | 7-146868 A | 6/1995 |

(Continued)

OTHER PUBLICATIONS

Dahlgren, "Technical Overview of Cognition's Semantic NPL(TM) (as Applied to Search)", Cognition Technologies, Inc., 2007, 20 pages.

(Continued)

*Primary Examiner* — Kuen Lu
(74) *Attorney, Agent, or Firm* — Matthew J. Bussan (57) ABSTRACT

Methods, apparatus and systems, including computer program products, for creating subject matter synonyms from definitions extracted from a subject matter glossary. Confidence scores, each representing a likelihood that two terms defined in the subject matter glossary are synonyms, are determined by applying natural language processing (e.g., passage term matching, lexical matching, and syntactic matching) to the extracted definitions. A subject matter thesaurus is built based on the confidence scores. In one embodiment, a statement containing a first term is created based on an extracted definition of the first term, a modified statement is created by substituting a second term in the statement in lieu of the first term, a corpus is searched, and a confidence score is determined based on evidence in the corpus that the modified statement is accurate. The first and second terms are marked as synonyms if the confidence score is greater than a threshold.

14 Claims, 6 Drawing Sheets

(56) References Cited

U.S. PATENT DOCUMENTS

| | | | |
|---|---|---|---|
| 7,991,733 | B2 | 8/2011 | Mons et al. |
| 8,355,905 | B2 | 1/2013 | Fokoue-Nkoutche et al. |
| 8,359,193 | B2 | 1/2013 | Chen et al. |
| 9,020,950 | B2 * | 4/2015 | Janssen, Jr. ........ G06F 17/30734 707/742 |
| 2004/0093331 | A1 | 5/2004 | Garner et al. |
| 2005/0091038 | A1 * | 4/2005 | Yi ....................... G06F 17/2715 704/10 |
| 2007/0005621 | A1 | 1/2007 | Lesh et al. |
| 2008/0154848 | A1 * | 6/2008 | Haslam ............. G06F 17/30011 |
| 2010/0121885 | A1 | 5/2010 | Hosomi et al. |
| 2011/0184727 | A1 | 7/2011 | Connor |
| 2011/0213804 | A1 | 9/2011 | Lee et al. |
| 2012/0078826 | A1 | 3/2012 | Ferrucci et al. |
| 2013/0132308 | A1 | 5/2013 | Boss et al. |
| 2013/0132363 | A1 | 5/2013 | Dong et al. |
| 2013/0159306 | A1 | 6/2013 | Janssen, Jr. et al. |
| 2013/0254220 | A1 * | 9/2013 | Loritz ................. G06F 17/2795 707/765 |

FOREIGN PATENT DOCUMENTS

| | | |
|---|---|---|
| JP | 2000-207407 A | 7/2000 |
| WO | 2011092465 A1 | 8/2011 |

OTHER PUBLICATIONS

Hagiwara, "A Supervised Learning Approach to Automatic Synonym Identification based on Distributional Features", Proceedings of the ACL-08: HLT Student Research Workshop (Companion Volume), Jun. 2008, 6 pages.
Wikipedia contributors, "WordNet", Wikipedia, The Free Encyclopedia, http://en.wikipedia.org/w/index.php?oldid=550139585 (accessed Apr. 18, 2013).
Ferrucci et al., "Building Watson: An Overview of the DeepQA Project", Artificial Intelligence, vol. 31, No. 3, Fall 2010, pp. 59-79.
Friedrich, "Soft Matching Extensions for Passage Scoring using Syntactic-Semantic Graphs in Question Answering", Master Thesis, Saarland University, Sep. 19, 2011, 84 pages. Retrieved from http://www.coli.uni-saarland.de/~afried/en/contents/MasterThesis_A_Friedrich.pdf (accessed Apr. 29, 2013).
International Search Report and Written Opinion; Dec. 12, 2014.

* cited by examiner

USING NATURAL LANGUAGE PROCESSING (NLP) TO CREATE SUBJECT MATTER SYNONYMS FROM DEFINITIONS

BACKGROUND

The present invention relates in general to the field of information technology, and more specifically, to natural language processing systems.

SUMMARY

Various embodiments of the present invention provide methods, apparatus and systems, including computer program products, for creating subject matter synonyms from definitions extracted from a subject matter glossary. Confidence scores, each representing a likelihood that two terms defined in the subject matter glossary are synonyms, are determined by applying natural language processing (e.g., passage term matching, lexical matching, and syntactic matching) to the extracted definitions. A subject matter thesaurus is built based on the confidence scores. In one embodiment, a statement containing a first term is created based on an extracted definition of the first term, a modified statement is created by substituting a second term in the statement in lieu of the first term, a corpus is searched, and a confidence score is determined based on evidence in the corpus that the modified statement is accurate. The first and second terms are marked as synonyms if the confidence score is greater than a threshold.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
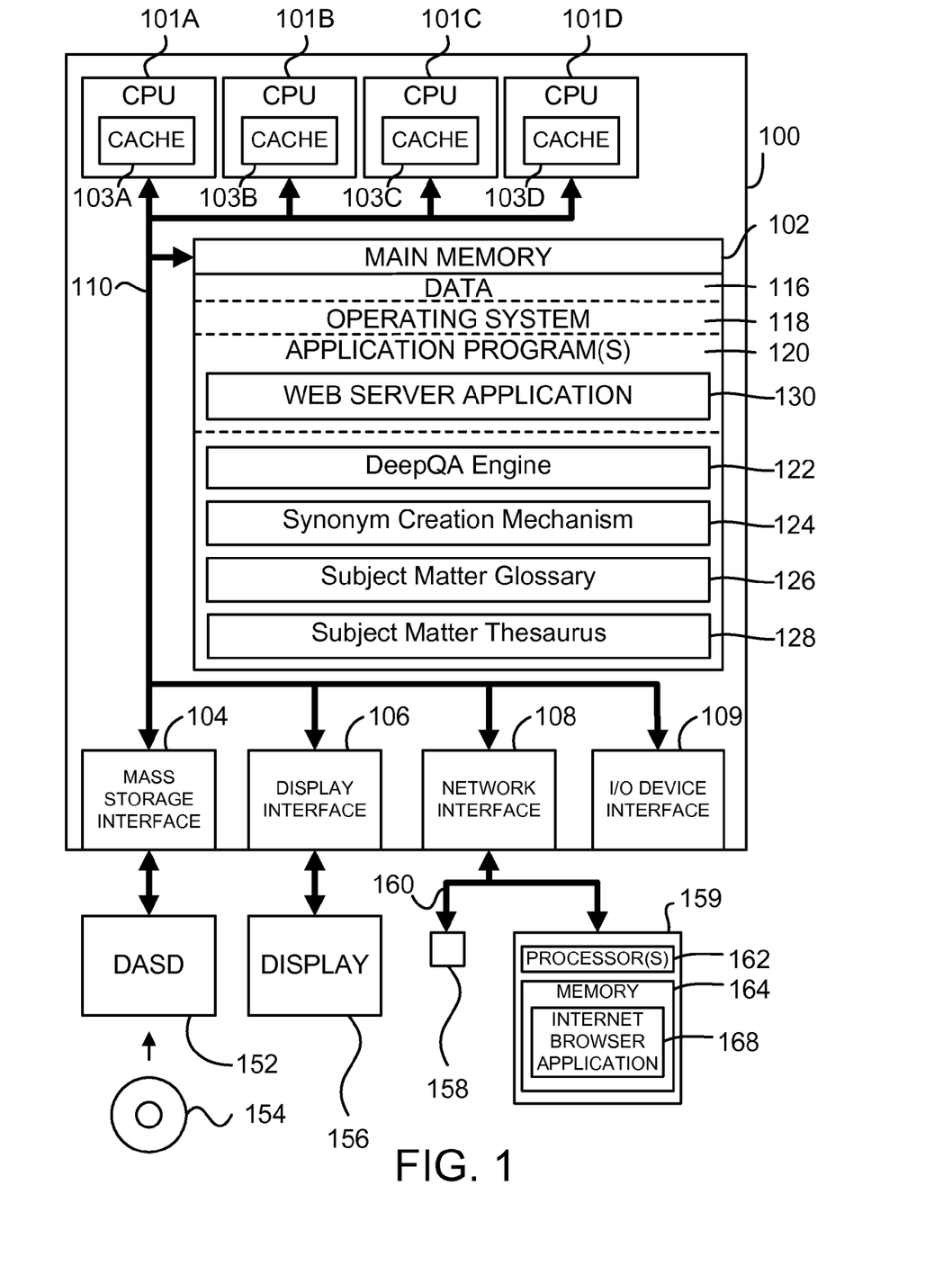
FIG. 1 is a block diagram illustrating a computer system for implementing a mechanism for creating subject matter synonyms from definitions of terms defined in a subject matter glossary in accordance with some embodiments of the present invention.

A computer system implementation of an embodiment of the present invention will now be described with reference to FIG. 1 in the context of a particular multi-user computer system 100, i.e., an IBM Power System computer system. However, those skilled in the art will appreciate that the method, apparatus, and computer program product of the present invention apply equally to any computer system, regardless of whether the computer system is a complicated multi-user computing apparatus (e.g., an IBM POWER7 processor-based server system or an IBM POWER7 processor-based blade system residing in an IBM BladeCenter chassis), a PC, or an embedded control system. As shown in FIG. 1, computer system 100 comprises one or more processors 101A, 101B, 101C and 101D (also collectively referred to herein as "processors 101"), a main memory 102, a mass storage interface 104, a display interface 106, a network interface 108, and an I/O device interface 109. These system components are interconnected through the use of a system bus 110.

In accordance with some embodiments of the present invention, a DeepQA engine 122, described further below, resides in the main memory 102 (at least in the embodiment shown in FIG. 1) for providing DeepQA functionality, such as advanced Natural Language Processing (NLP). One skilled in the art will appreciate, however, that the DeepQA engine 122 need not reside in the main memory 102 of the computer system 100. For example, the DeepQA engine 122 may comprise computer executable instructions maintained, for example, as a computer program product stored on a hard disk (e.g., on a DASD device 152) or system firmware. Firmware is "software" stored in a memory chip that holds its content without electrical power, such as for example, read-only memory (ROM), programmable ROM (PROM), erasable programmable ROM (EPROM), electrically erasable programmable ROM (EEPROM), and nonvolatile random access memory (nonvolatile RAM).

International Business Machines Corporation (IBM) has published detail of computing methods and technologies that are able to assist humans with certain types of semantic query and search operations, such as the type of natural question-and-answer paradigm of a medical environment (or any other deep topic environment). IBM research scientists have been working on Deep Question-Answering (DeepQA) methods that are able to understand complex questions posted (and input) in natural language, and are able to answer the question with enough precision, confidence, and speed to augment human handling of the same questions within a given environment (e.g., a medical inquiry and diagnostic paradigm where time-to-answer is of the essence).

DeepQA is an application of advanced Natural Language Processing, Information Retrieval, Knowledge Representation and Reasoning, and Machine Learning technologies to the field of open-domain question answering, all executing on a suitable computing platform. Such methods of hypothesis generation, evidence gathering, analysis, and scoring may be effectively executed by a wide range of computing platforms.

Similarly, IBM has also published computing methods which combine semantic elements with information search elements to form Unstructured Information Management Architecture (UIMA), which is now maintained as an open source project by the Apache organization.

Whereas ample information is available in the public domain regarding DeepQA and UIMA, the present disclosure presumes those ordinarily skilled in the art may access and apply that information to realized embodiments of the present invention.

As mentioned above, DeepQA is an application of advanced Natural Language Processing, Information Retrieval, Knowledge Representation and Reasoning, and Machine Learning technologies. Hence, in accordance with some embodiments of the present invention, the DeepQA engine 122 provides those conventional DeepQA functionalities. Also, the DeepQA engine 122 may provide conventional UIMA functionalities.

In performing natural language processing, specifically in the area of DeepQA, it is extremely important to determine when terms are synonyms of each other. Because there are many ways to say the same thing in the English language (or any other language), it becomes necessary at many phases of performing DeepQA to know if two words mean the same thing. Synonyms must be treated differently than having terms that are closely related, but are not synonyms. For example, if there is a question in the field of health care related to heart attack, it is important to know that "myocardial infarction" is the same thing as a heart attack. Symptoms and treatments related to one term are therefore related to the other term. Without knowing that the two terms are synonyms, two major short comings in DeepQA methods are encountered.

First, the DeepQA system could incorrectly return "myocardial infarction" as a sign or symptom related to "heart attack". Because there is an abundance of literature that mentions both terms, a DeepQA system that is unaware of the fact that these terms are synonyms would not be able to distinguish between "myocardial infarction" and an actual symptom such as "shortness of breath" or "chest pain". While this is a trivial example, it could in theory lead to bad results, such as Q: What is a primary symptom of a heart attack? A: Myocardial infarction.

Second, the DeepQA system could incorrectly score the possible answers to a question by treating the synonyms independently. Because the two terms are synonyms, the evidence supporting either heart attack or myocardial infarction as a possible answer should be grouped together. This is critical, since it would often mean the difference between getting the right or wrong answer. If there is a lower scored answer, it could be incorrectly chosen as the best answer. This could occur if two synonyms for the correct answer were not known to be synonyms, and therefore their scores, which should have been combined, were individually lower than one of the wrong answers.

For these reasons, and many others, it is critical to build up a list of synonyms. The problem is that other than a general English language thesaurus, it is seldom the case that a detailed set of synonyms exists for a subject area in which deep expertise is required. Because such areas of knowledge are precisely the types of knowledge for which an NLP expert system would be helpful, it is most important to find synonyms in the areas least likely to have an already generated thesaurus. It is not practical to extract potentially thousands of terms and use a human subject matter expert to compare each one to each possible pairing, and find all groups of synonyms. Typically, numerous glossaries exist for a given deep topic (such as heart surgery, foreign currency exchange, aeronautical engineering, etc.), but no definitive set of synonyms exists. That is, while it is common to have a subject matter glossary of terms, there is almost never a subject matter thesaurus of terms.

In accordance with some embodiments of the present invention, a synonym creation mechanism 124, described further below, resides in the main memory 102 (at least in the embodiment shown in FIG. 1) and operates in conjunction with, or is a component of, the DeepQA engine 122 for creating subject matter synonyms from definitions of terms defined in a subject matter glossary (e.g., a subject matter glossary 126). The synonym creation mechanism 122 may use these subject matter synonyms to build a subject matter thesaurus (e.g., a subject matter thesaurus 128). One skilled in the art will appreciate, however, that the synonym creation mechanism 124 need not reside in the main memory 102 of the computer system 100. For example, the synonym creation mechanism 124 may comprise computer executable instructions maintained, for example, as a computer program product stored on a hard disk (e.g., on a DASD device 152) or system firmware.

In accordance with some embodiments of the present invention, the synonym creation mechanism 124 includes instructions capable of executing on the processors 101 or statements capable of being interpreted by instructions executing on the processors 101 to perform the functions as further described below with reference to FIGS. 3-6. Also in accordance with some embodiments of the present invention, the synonym creation mechanism 124 may include instructions capable of executing on processor(s) of a networked device or statements capable of being interpreted by instructions executing on such processor(s) of the networked device to perform the functions as further described below with reference to FIGS. 3-6. For example, the synonym creation mechanism 124 may include instructions that execute on the processor(s) 162 of the client system 159.

Figure 2:
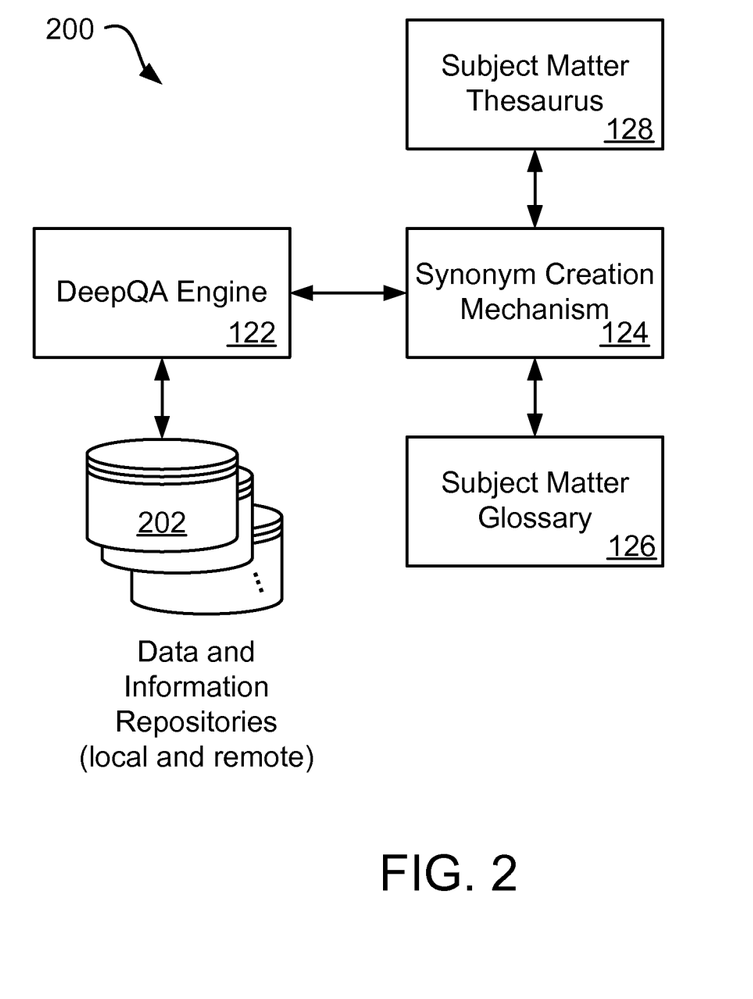
FIG. 2 is a block diagram illustrating a system for creating subject matter synonyms from definitions of terms defined in a subject matter glossary by using a corpus in accordance with some embodiments of the present invention.

For example, in accordance with some embodiments of the present invention, the synonym creation mechanism 124 (operating in conjunction with the DeepQA engine 122) includes instructions capable of executing on the processors 101 to build the subject matter thesaurus 128 using the subject matter glossary 126 (and, optionally, a corpus accessible by the DeepQA engine 122, such as the Data and Information Repositories 202 shown in FIG. 2).

The subject matter glossary 126 can in some embodiments be a superset of a lexicon, that is, an alphabetical list of terms associated with a particular subject matter (e.g., heart surgery, foreign currency exchange, aeronautical engineering, or other deep topic) where each term in the list of terms is accompanied by one or more term definitions. For purposes of this document, including the claims, the terminology "term" encompasses both words and phrases. Phrases are sometimes referred to in the art as "collocations" (i.e., a sequence to words that together form a specific meaning, such as "heart attack").

For purposes of this document, including the claims, the terminology "glossary" encompasses both glossaries and dictionaries. The subject matter glossary 126 in some embodiments of the invention is an industry specific dictionary or glossary. A simple example of an industry specific dictionary for the area of heart surgery, for example, can include terms such as "heart attack", "myocardial infarction", etc. and their definitions.

The subject matter thesaurus 128 can in some embodiments be built by the synonym creation mechanism 124 in the form of a list of synonyms associated with a particular subject matter. For example, the subject matter thesaurus 128 may be a list of synonyms organized in an alphabetical list of synonym pairs (i.e., each synonym pair includes two terms that are synonyms). In other embodiments the subject matter thesaurus 128 can be built by the synonym creation mechanism 124 in the form of a lexical database that groups terms into sets of synonyms associated with a particular subject matter. For example, the subject matter thesaurus 128 may be a lexical database organized in "synsets" akin to those of WordNet. WordNet is a conventional lexical database that groups English language words into sets of synonyms called "synsets", provides short, general definitions, and records the various semantic relations between these synsets. For purpose of this document, including the claims, the terminology "thesaurus" encompasses both a list of synonyms and a lexical database that groups terms into sets of synonyms.

Even though the subject matter glossary 126 and the subject matter thesaurus 128 have been illustrated in FIG. 1 as residing in the main memory 102, they can also be fully or partially external to the main memory 102. For example, the subject matter glossary 126 and/or the subject matter thesaurus 128 may be stored on a hard disk (e.g., on a DASD device 152) of the computer system 100 or may be located on a remote computer system or server, and communicate with the processor 101 through any type of network, such as a local area network (LAN) or a wide area network (WAN), for example.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with some embodiments contains data 116, an operating system 118 and application software (e.g., one or more application programs 120 such as a web server application 130), utilities and other types of software. In addition, main memory 102 includes the DeepQA engine 122, the synonym creation mechanism 124, the subject matter glossary 126, and the subject matter thesaurus 128, each of which may in various embodiments exist in any number. (One skilled in the art will appreciate that the DeepQA engine 122, the synonym creation mechanism 124, the subject matter glossary 126, and the subject matter thesaurus 128 need not reside in the main memory 102 of the computer system 100.) Each of these entities in memory is described further below.

Although the DeepQA engine 122, the synonym creation mechanism 124, the subject matter glossary 126, and the subject matter thesaurus 128 are illustrated as being contained within the main memory 102, in other embodiments some or all of them may be on different electronic devices and may be accessed remotely (e.g., via a network 160). Thus, for example, the synonym creation mechanism 124 may be at least partially located or implemented on a networked device (e.g., a computer system, such as a workstation 158 and/or a client system 159), while the DeepQA engine 122 resides on the computer system 100.

In accordance with the some embodiments of the present invention, the computer system 100 may be a server system connected to a client system 159 across a network 160. The client system 159 (if present) includes one or more processors 162 and a memory 164. The memory 164 has stored therein, at least at various times, an internet browser application 168 providing the client system 159 the ability to remotely access data, applications and other types of software (e.g., the DeepQA engine 122 and the synonym creation mechanism 124) located on the server 100. For example, the internet browser application 168 (e.g., HTTP-based, HTTPS-based, etc.) may transfer files and data via the web server application 130 of the server 100. One skilled in the art will appreciate, however, that utilization of an internet browser application is merely exemplary. Suitable alternatives include green screen, VNC (virtual network computing), etc.

The web server application 130 may include any suitable web server programming that enables access and data exchange with the client system 159. For example, the web server application 130 may supply software code associated with the DeepQA engine 122 and/or the synonym creation mechanism 124 to the client system 159 in the form of an applet, plug-in, or the like for viewing and/or interaction by the user at the client system 159. Additionally, while the above exemplary embodiment of the present invention describes the client system 159 as including the internet browser application 168 and the server 100 as including the web server application 130, one skilled in the art would recognize that any type of monolithic application could be employed, using suitable protocols, at both the server 100 and the client system 159.

The DeepQA engine 122 and/or synonym creation mechanism 124 may comprise system firmware or computer executable instructions maintained, for example, as a computer program product stored on a hard disk (e.g., on a DASD device 152).

In another embodiment, the DeepQA engine 122 and/or synonym creation mechanism 124 may be implemented in hardware via logic gates and/or other appropriate hardware techniques in lieu of, or in addition to, a processor-based system.

While the synonym creation mechanism 124 is shown in FIG. 1 as a separate entity in memory, some embodiments expressly extend to the synonym creation mechanism 124 being implemented within the DeepQA engine 122, application software, utilities, or other types of software within the scope of such embodiments. For example, the synonym creation mechanism 124 may be a component of the DeepQA engine 122.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, application program(s) 120, DeepQA engine 122, synonym creation mechanism 124, subject matter glossary 126, subject matter thesaurus 128, and web server application 130, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100.

Operating system 118 is a multitasking operating system known in the industry as IBM i (formerly IBM i5/OS); however, those skilled in the art will appreciate that the spirit and scope of the present invention is not limited to any one operating system. There are many suitable multitasking operating systems, such as AIX, Linux, etc.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in some embodiments each include separate, fully programmed microprocessors that are used to off-load I/O related processing from processors 101. However, those skilled in the art will appreciate that the present invention applies equally to computer systems that simply use I/O adapters to perform similar functions.

Mass storage interface 104 is used to connect one or more mass storage devices 152 (such as a direct access storage device (DASD), CD-ROM drive, DVD-ROM drive, CD-RW drive, and the like) to computer system 100. One specific type of mass storage device is a CD-ROM drive, which may read data from a CD-ROM 154. Another specific type of mass storage device is a readable and writable CD-RW drive, which may write data to and read data from a CD-RW.

The mass storage interface 104 may also be used to locally connect a corpus (such as the Data and Information Repositories 202 shown in FIG. 2) to computer system 100. In accordance with some embodiments of the present invention, the DeepQA engine 122 has access to at least one local and/or remote corpus.

Display interface 106 is used to directly connect one or more displays 156 to computer system 100. These displays 156, which may be non-intelligent (i.e., dumb) terminals or fully programmable workstations, are used to allow system administrators and other users to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems (such as the workstations 158 and/or the client systems 159) to computer system 100 across a network 160. In accordance with some embodiments of the present invention, these networked computer systems, like the client system 159, may include a computer system on which a web browser program resides by which the DeepQA engine 122 and/or the synonym creation mechanism 124 may be accessed.

The network interface 108 may also be used to remotely connect a corpus (such as the Data and Information Repositories 202 shown in FIG. 2) to computer system 100 across the network 160. In accordance with some embodiments of the present invention, the DeepQA engine 122 has access to at least one local and/or remote corpus.

The present invention applies equally no matter how computer system 100 may be connected to other computer systems (such as the workstations 158 and/or the client systems 159), regardless of whether the network connection 160 is made using present-day analog and/or digital techniques or via some networking mechanism of the future. In addition, many different network protocols can be used to implement network 160. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while the description above is in the context of a fully functional computer system, those skilled in the art will appreciate that the synonym creation mechanism 124, as well as the other software type entities described herein may be distributed as an article of manufacture (also referred to herein as a "computer program product") in a variety of forms, and the claims extend to all suitable types of computer-readable media used to actually carry out the distribution, including recordable type media such as floppy disks and CD-RWs, CD-ROMs (e.g., CD-ROM 154) and DVD-ROMs.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

FIG. 2 is a block diagram illustrating a system 200 for creating subject matter synonyms from definitions of terms defined in a subject matter glossary by using a corpus (e.g., Data and Information Repositories 202) in accordance with some embodiments of the present invention. In accordance with these embodiments, the DeepQA engine 122 has access to local and/or remote Data and Information Repositories 202.

The Data and Information Repositories 202, in accordance with some embodiments of the present invention, constitute a corpus of material that is relevant with respect to the subject matter glossary 226. Typically, such a corpus is a large and structured set of texts. In the field of structural engineering, for example, in accordance with some embodiments of the present invention the subject matter glossary 226 may be a dictionary of structural engineering terms and the Data and Information Repositories 202 may include, but are not limited to, encyclopedias of structural engineering, structural engineering journals, structural engineering books, textbooks and handbooks, and webpages pertaining to structural engineering, as well as other dictionaries of structural engineering terms.

In accordance with an illustrative embodiment of the present invention, two terms (i.e., term_1 and term_2) are taken from a glossary (e.g., a medical glossary, a financial textbook, a web page listing meanings of computer jargon, etc.) and an examination of the definitions of the two terms is performed to find similar descriptions within the definitions of the two terms based on the English language (or other language) description, frequency of words, sentence construction, and other deep Q&A methods to establish the likelihood of the two terms being synonyms. This process is repeated for other term pairs in the glossary. At this point, one or more lists of term pairs may be generated and sorted by closest match (e.g., term pairs may be sorted from the highest likelihood of being synonyms to the lowest likelihood of being synonyms).

In this illustrative embodiment, those term pairs each with a likelihood of being synonyms above a first threshold could be immediately marked as synonyms (e.g., included in a list of term pairs to be included in a thesaurus), based on having nearly identical definitions. Those term pairs each with a likelihood of being synonyms below the first threshold but above a second threshold (i.e., the second threshold is lower than the first threshold) could be marked for further review (e.g., included in a list of term pairs to be reviewed by a human reviewer). The second threshold may require a human reviewer, but with the list being scoped down to a much smaller set, this task now becomes manageable. Those term pairs each with a likelihood of being synonyms below the second threshold could be immediately disregarded.

This illustrative embodiment uses conventional NLP processing, which understands English language (or other language) text, but not the specific subject matter. By processing through each one of n number of terms, this illustrative embodiment runs through $n^2$ iterations asking an NLP Q&A service (e.g. a DeepQA engine 122) the question: "Is term_1 the same thing as term_2?" Using the definitions taken from the glossary, the NLP Q&A service gives its best answer using one or more conventional NLP techniques, such as pattern matching, term matching, etc. The end result (at least in this illustrative embodiment) is that a set of synonyms is constructed that can now be used by the NLP Q&A service (or other Expert system). In this illustrative embodiment, NLP components of an Expert system are applied with respect to a set of subject matter terms and definitions. The NPL components of an Expert system include, but are not limited to, understanding the English language (or other language) and an ability to answer questions. By applying the NLP components to these definitions and asking the synonym questions, this illustrative embodiment makes it possible to create a subject matter thesaurus. This new thesaurus may then become part of the Expert system.

In accordance with a second illustrative embodiment, using the deep QA paradigm, one starts with a question: "What phrase means the same thing as term_X?" Term_X is a term defined in a subject matter glossary. This question will be repeated for the other terms defined in the subject matter glossary.

The first step in the pipeline of the second illustrative embodiment is to identify the candidate answers, which in the second illustrative embodiment are the other terms defined in the subject matter glossary. These candidate answers ($C_0, C_1, C_2, \ldots C_n$) can each be considered potential synonyms with respect to term_X.

The second step in the pipeline of the second illustrative embodiment is to build up evidence to support each candidate answer, which in the second illustrative embodiment is accomplished using the definition in the glossary for term_X, along with the definition of each candidate answer. The second illustrative embodiment also augments this evidence with other passages found in supporting material (e.g., Data and Information Repositories 202 in FIG. 2). In the field of structural engineering, for example, in accordance with the second illustrative embodiment, one would employ: 1.) a detailed glossary of terms of structural engineering terms to find the candidate answers and their definitions, along with the term_X and its definition; and 2.) a large corpus of literature in the field of structural engineering (e.g., books, journals, articles, webpages, etc.).

The second illustrative embodiment may employ a hypothesis: if the first candidate_$C_0$ is a synonym for the term_X, then a high NLP match between their definitions will be found. The hypothesis would be employed during the first step of the second illustrative embodiment and could immediately filter out bad matches.

The second step of the second illustrative embodiment may employ DeepQA technologies such as replacing the term_X with the candidate_C0, and finding evidence to support the accuracy of the replacement. For example, if a glossary of structural engineering terms included the definition: "Term_X is a technique used by structural engineers to estimate the load on a cross beam . . . ", candidate_C0 is substituted for term_X. This substitution results in a new sentence: "Candidate_C0 is a technique used by structural engineers to estimate the load on a cross beam . . . ", which may or may not be accurate. The corpus is then searched for evidence that the sentence resulting from the substitution is accurate. Also, term_X is substituted for candidate_C0 in the definition of candidate_C0 in the glossary, and the corpus is then searched for evidence that the sentence resulting from that substitution is accurate.

The term pairs with the highest matches may be marked as synonyms. There may be an intermediate category of term pairs that would warrant some review by a human subject matter expert. The vast majority of the pairs would be discarded and not considered as possible synonyms.

One skilled in the art will appreciate that many NLP techniques may be used for the match of the definitions and for looking in the corpus for supporting evidence. Examples include, but are not limited to, term matching, passage term match, word position, n-gram analysis, expansion of common English language (or other language) synonyms, abbreviation expansion, and many others. While the specific NLP techniques used are not part of the present invention, their application to synonym identification using definitions from a subject matter glossary is novel. By taking a deep subject matter glossary and a corpus of relevant material in accordance with some embodiments of the present invention, and by applying conventional NLP techniques, a subject matter thesaurus can be built.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
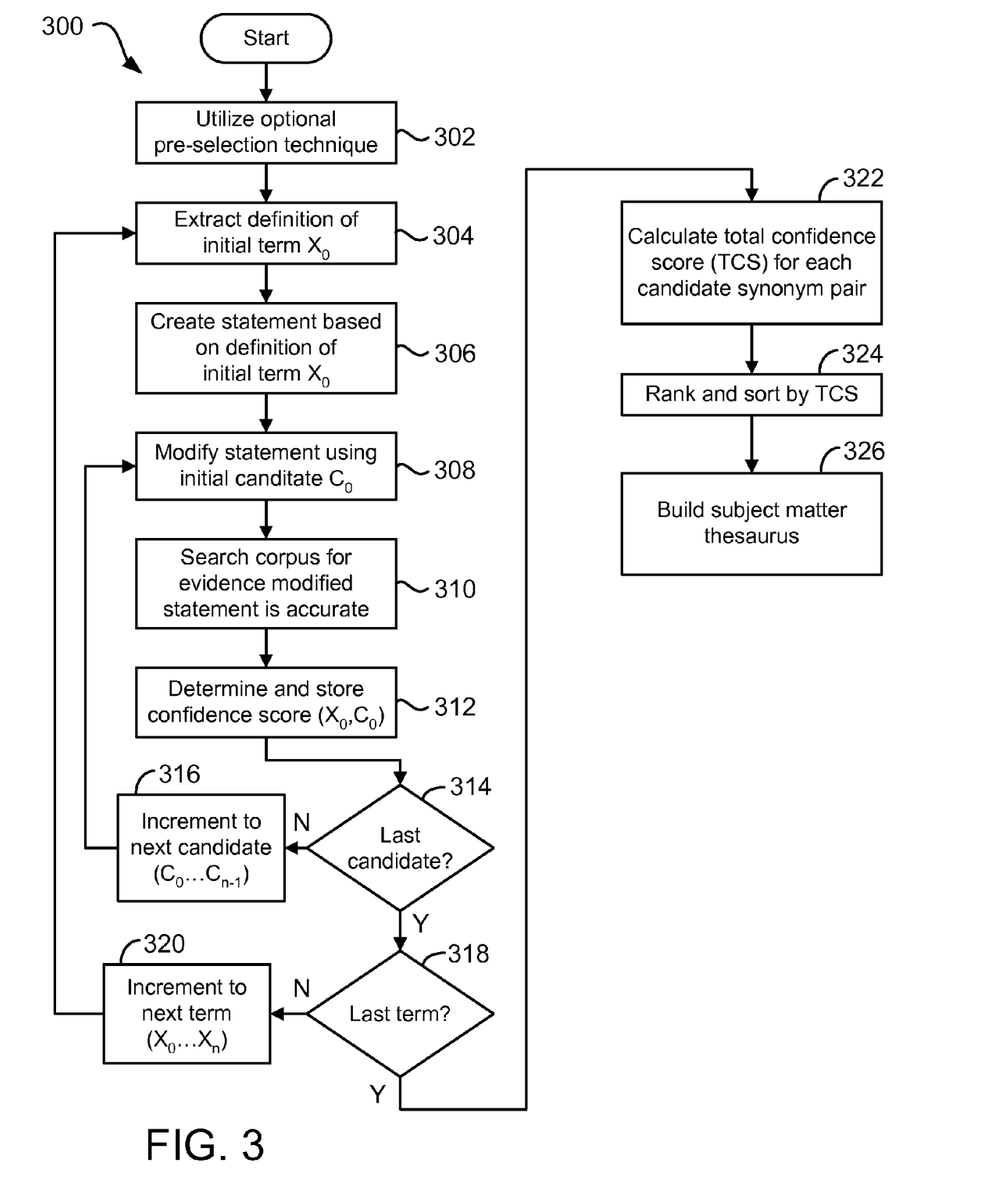
FIG. 3 is a flow diagram illustrating a method for creating subject matter synonyms from definitions of terms defined in a subject matter glossary by using a corpus in accordance with some embodiments of the present invention.

FIG. 3 is a flow diagram illustrating a method 300 for creating subject matter synonyms from definitions of terms defined in a subject matter glossary by using a corpus in accordance with some embodiments of the present invention. In the method 300, the steps discussed below (steps 302-326) are performed. These steps are set forth in their preferred order. It must be understood, however, that the various steps may occur at different times relative to one another than shown, or may occur simultaneously. Moreover, those skilled in the art will appreciate that one or more of the steps may be omitted.

Optionally, the method 300 may begin by utilizing a pre-selection technique to filter out bad matches (step 302). If utilized, the pre-selection technique may, for example, discard the vast majority of possible synonym pairs in a subject matter glossary by the applying NLP techniques (e.g., term matching, word position, etc.) to the definitions of each possible synonym pair in the subject matter glossary, without searching in a corpus. For example, the synonym creation mechanism may access the subject matter glossary and pass the definitions of each candidate synonym pair to the DeepQA engine, which then applies NLP techniques to the definitions (without searching in a corpus) and returns a confidence score for each possible synonym pair to the synonym creation mechanism, which then filters out bad matches. If a pre-selection technique is not utilized and the number of terms defined in a subject matter glossary is n, then the number of candidate synonyms pairs, each of which will require a search in the corpus (e.g., step 310, described below), is $n^2$. That is, without pre-selection, the number of candidate synonym pairs is equal to $n^2$. Utilization of a pre-selection technique can significantly reduce the amount of time required to perform the method 300 because the number of candidate synonym pairs, each of which will require a search in the corpus (e.g., step 310, described below), is greatly reduced. That is, with pre-selection, the number of candidate synonym pairs is much less than $n^2$. An exemplary pre-selection technique 500 is described below with reference to FIG. 5.

The method 300 may continue (if a pre-selection technique is utilized), or begin (if a pre-selection technique is not utilized), by extracting a definition of an initial term $X_0$ from the subject matter glossary (step 304). For example, the synonym creation mechanism may access a subject matter glossary having n terms $(X_0, X_1, X_2, \ldots X_n)$ defined therein and extract the definition of the initial term $X_0$. One skilled in the art will appreciate that any of the n terms may be selected as the initial term.

Next, the method 300 creates a statement that contains the initial term $X_0$ and that is based on the definition of the initial term $X_0$ (step 306). For example, the initial term $X_0$ may be "absolute zero", with the subject matter glossary containing the definition of the initial term $X_0$ as follows: "absolute zero—the lowest possible temperature at which matter might exist; 0 K, −273.15° C." In step 306, the synonym creation mechanism may, for example, create a statement by rephrasing the extracted definition as follows: "Absolute zero is the lowest possible temperature at which matter might exist; 0 K, −273.15° C."

In this example, the subject matter glossary has n terms $(X_0, X_1, X_2, \ldots X_n)$. With respect to the initial term $X_0$, the subject matter glossary has n−1 candidate terms $(C_0, C_1, C_2, \ldots C_{n-1})$ that may or may not be synonyms. This example assumes no candidate terms have been discarded by an optional pre-selection technique. The n−1 candidate terms $(C_0, C_1, C_2, \ldots C_{n-1})$ correspond to terms $(X_1, X_2, X_3, \ldots X_n)$. The initial term $X_0$ forms a candidate synonym pair with each of the n−1 candidate terms $(C_0, C_1, C_2, \ldots C_{n-1})$. For example, the initial term $X_0$ and the initial candidate term $C_0$ form a candidate synonym pair $(X_0, C_0)$. One skilled in the art will appreciate that any of the n−1 terms may be selected as the initial candidate term.

The method 300 then modifies the statement using the initial candidate term $C_0$ (step 308). For example, the initial candidate term $C_0$ may be "acid". The synonym creation mechanism may, for example, extract the initial candidate term "acid" from the subject matter glossary and modify the statement created in step 306 by substituting the initial candidate term $C_0$ ("acid") for the initial term $X_0$ ("absolute zero"). In this case, the modified statement would read: "Acid is the lowest possible temperature at which matter might exist; 0 K, −273.15° C."

The method 300 then searches a corpus for evidence the modified statement (created in step 308) is accurate (step 310). For example, the synonym creation mechanism may pass the modified statement to the DeepQA engine, which then searches the Data and Information Repositories for evidence the modified statement (i.e., "Acid is the lowest possible temperature at which matter might exist; 0 K, −273.15° C.") is accurate. The DeepQA engine may, for example, search the Data and Information Repositories for passages that include terms present in the modified statement.

The method 300 then determines and stores a confidence score for the candidate synonym pair ($X_0$, $C_0$) based on evidence (found in step 310) the modified statement is accurate (step 312). For example, the DeepQA engine may calculate a confidence score (e.g., a final PTM score) for the candidate synonym pair ($X_0$, $C_0$) and pass the confidence score to the synonym creation mechanism, which then stores the confidence score. The DeepQA engine may, for example, utilize Passage Term Match (PTM) to determine the confidence score for the candidate synonym pair ($X_0$, $C_0$). For example, the DeepQA engine may calculate a PTM score for each passage that reflects how many terms are matched between the passage and the modified statement, and then compute a final PTM score as a weighted sum over the set of highest-ranked passages. One skilled in the art will appreciate that other NLP techniques (such as lexical match, syntactic match, etc.) may be used in lieu of, or in addition to, PTM.

The method 300 then determines whether the initial candidate term $C_0$ (or the then current candidate term $C_{(0 \ldots (n-1))}$) is the last candidate term (step 314).

If the initial candidate term $C_0$ (or the then current candidate term $C_{(0 \ldots (n-1))}$) is not the last candidate term $C_{n-1}$ (step 314=No), the method 300 proceeds to increment to the next candidate term and returns to step 308 (step 316). For example, in the case of the initial candidate term $C_0$, the method 300 increments the candidate term to the next candidate term $C_1$.

If the initial candidate term $C_0$ (or the then current candidate term $C_{(0 \ldots (n-1))}$) is the last candidate term $C_{n-1}$ (step 314=Yes), the method 300 proceeds to step 318. The method 300 then determines whether the initial term $X_0$ (or the then current term $X_{(0 \ldots n)}$) is the last term $X_n$ (step 318).

If the initial term $X_0$ (or the then current term $X_{(0 \ldots n)}$) is not the last term $X_n$ (step 318=No), the method 300 proceeds to increment to the next term and returns to step 304 (step 320). For example, in the case of the initial term $X_0$, the method 300 increments the term to the next term $X_1$.

If the initial term $X_0$ (or the then current term $X_{(0 \ldots n)}$) is the last term $X_n$ (step 318=Yes), the method 300 proceeds to step 322. The method 300 then calculates a total confidence score (TCS) for each candidate synonym pair (step 322). For example, the method 300 may calculate a TCS for each candidate synonym pair by combining confidence scores determined in step 312 that include the same two terms (e.g., TCS=confidence score (absolute zero, acid)+confidence score (acid, absolute zero); that is, the sum of the confidence score determined in step 312 when "acid" is substituted in the definition of "absolute zero" and the confidence score determined in step 312 when "absolute zero" is substituted in the definition of "acid".)

The method 300 continues by ranking and sorting the TCS for each candidate synonym pair (step 324). For example, the method 300 may rank and sort the total confidence scores so that the candidate synonym pairs are listed in the order of their TCS from the highest TCS to the lowest TCS.

The method 300 ends by building a subject matter thesaurus based on the TCS for each candidate synonym pair (step 326). For example, the method 300 may utilize a selection technique that employs one or more thresholds to build a subject matter thesaurus. An exemplary selection technique 400 is described below with reference to FIG. 4.

Figure 4:
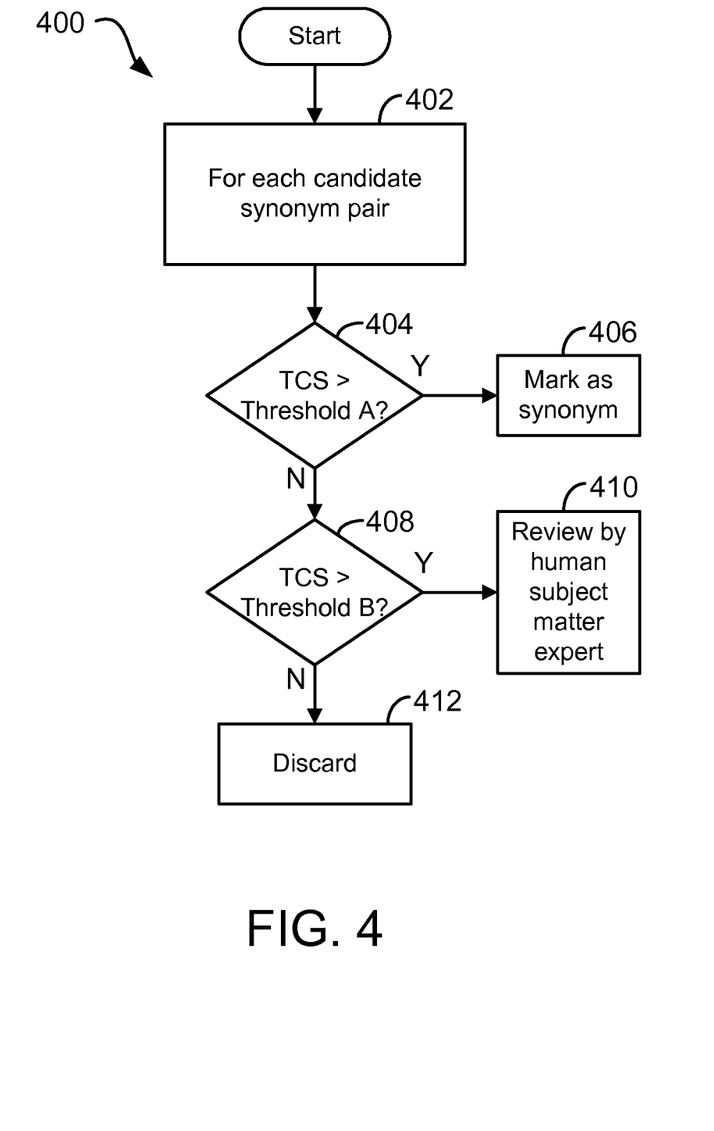
FIG. 4 is a flow diagram illustrating a selection technique that may be utilized in the method illustrated in FIG. 3 to build a subject matter thesaurus in accordance with some embodiments of the present invention.

FIG. 4 is a flow diagram illustrating a selection technique 400 that may be utilized in the method illustrated in FIG. 3 to build a subject matter thesaurus (i.e., step 326 in FIG. 3) in accordance with some embodiments of the present invention. In the selection technique 400, the steps discussed below (steps 402-412) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The selection technique 400, which employs two thresholds (i.e., threshold_A and threshold_B) to build a subject matter thesaurus, is performed for each candidate synonym pair (step 402).

The selection technique 400 determines whether the TCS for the candidate synonym pair is greater than threshold_A (step 404). A TCS greater than threshold_A is highly indicative that the terms of the candidate synonym pair are indeed synonyms.

If the TCS for the candidate synonym pair is greater than threshold_A (step 404=Yes), the selection technique 400 proceeds to mark the candidate synonym pair as a synonym (step 406). Step 406 may include listing the candidate synonym pair in a subject matter thesaurus.

If the TCS for the candidate synonym pair is not greater than threshold_A (step 404=No), the selection technique 400 proceeds to step 408. The selection technique then determines whether the TCS for the candidate synonym pair is greater than threshold_B (step 408). A TCS in an intermediate range greater than threshold_B but not greater than threshold_A is indicative that confidence level is not sufficient to make the synonym determination. In this intermediate range, further consideration (e.g., review by a human subject matter expert) is required to make the synonym determination.

If the TCS for the candidate synonym pair is greater than threshold_B (step 408=Yes), the selection technique 400 proceeds to mark the candidate synonym pair as a synonym for review by a human subject matter expert (step 410). If the human subject matter expert determines that the terms of the candidate synonym pair are indeed synonyms, step 410 may include listing the candidate synonym pair in the subject matter thesaurus. This step may be performed by the synonym creation mechanism, in conjunction with the human subject matter exert.

If the TCS for the candidate synonym pair is not greater than threshold_B (step 408=No), the selection technique 400 proceeds to step 412. The selection technique then discards the candidate synonym pair (step 412). A TCS not greater than threshold_B is highly indicative that the terms of the candidate synonym pair are not synonyms.

Threshold_A and threshold_B may have fixed values or may be dynamic. For example, threshold_A and/or threshold_B may be determined using a machine learning technique that employs several known synonym pairs. An exemplary machine learning technique 600 is described below with reference to FIG. 6.

Figure 5:
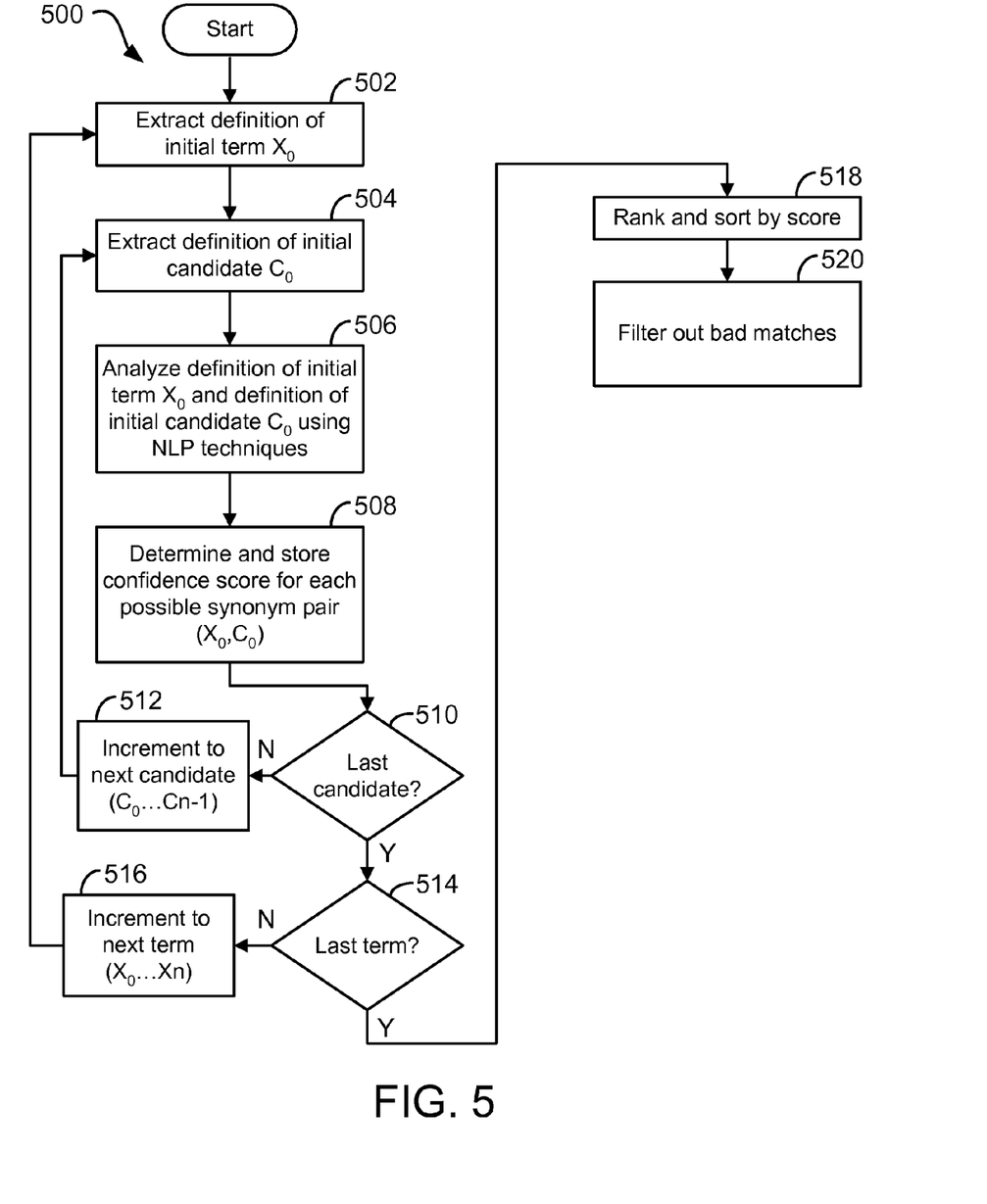
FIG. 5 is a flow diagram illustrating a pre-selection technique that may be utilized in the method illustrated in FIG. 3 to filter out bad matches in accordance with some embodiments of the present invention.

FIG. 5 is a flow diagram illustrating a pre-selection technique 500 that may be utilized in the method illustrated in FIG. 3 to filter out bad matches (i.e., step 302 in FIG. 3) in accordance with some embodiments of the present invention. In the pre-selection technique 500, the steps discussed below (steps 502-520) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The pre-selection technique 500 begins by extracting a definition of an initial term $X_0$ from the subject matter glossary (step 502). For example, the synonym creation mechanism may access a subject matter glossary having n terms ($X_0$, $X_1$, $X_2$, ... $X_n$) defined therein and extract the definition of the initial term $X_0$. One skilled in the art will appreciate that any of the n terms may be selected as the initial term.

For example, the initial term $X_0$ may be "absolute zero", with the subject matter glossary containing the definition of the initial term $X_0$ as follows: "absolute zero—the lowest possible temperature at which matter might exist; 0 K, −273.15° C."

In this example, the subject matter glossary has n terms ($X_0$, $X_1$, $X_2$, ... $X_n$). With respect to the initial term $X_0$, the subject matter glossary has n−1 candidate terms ($C_0$, $C_1$, $C_2$, ... $C_{n-1}$) that may or may not be synonyms. The n−1 candidate terms ($C_0$, $C_1$, $C_2$, ... $C_{n-1}$) correspond to terms ($X_1$, $X_2$, $X_3$, ... $X_n$). The initial term $X_0$ forms a candidate synonym pair with each of the n−1 candidate terms ($C_0$, $C_1$, $C_2$, ... $C_{n-1}$). For example, the initial term $X_0$ and the initial candidate term $C_0$ form a candidate synonym pair ($X_0$, $C_0$). One skilled in the art will appreciate that any of the n−1 terms may be selected as the initial candidate term.

The pre-selection technique 500 continues by extracting a definition of an initial candidate term $C_0$ from the subject matter glossary (step 504). For example, the synonym creation mechanism may extract the definition of the initial term $C_0$.

For example, the initial candidate term $C_0$ may be "acid", with the subject matter glossary containing the definition of the initial candidate term $C_0$ as follows: "acid—a substance which upon being dissolved in water produces a solution in which [H+] is greater than $10^{-7}$ M. Examples: HCl, $HNO_3$, $H_2CO_3$, $CH_3COOH$."

The pre-selection technique 500 then analyzes the definition of the initial term $X_0$ ("absolute zero—the lowest possible temperature at which matter might exist; 0 K, −273.15° C.") and the definition of the initial candidate term $C_0$ ("acid—a substance which upon being dissolved in water produces a solution in which [H+] is greater than $10^{-7}$ M. Examples: HCl, $HNO_3$, $H_2CO_3$, $CH_3COOH$.") using one or more NLP techniques (step 506). For example, the synonym creation mechanism may pass the definitions to the DeepQA engine, which then analyzes the definitions using one or more NLP techniques, such as term matching and word position.

The pre-selection technique 500 then determines and stores a confidence score for the candidate synonym pair ($X_0$, $C_0$) based on the analysis performed in step 506 (step 508). For example, the DeepQA engine may calculate a confidence score for the candidate synonym pair ($X_0$, $C_0$) and pass the confidence score to the synonym creation mechanism, which then stores the confidence score. The DeepQA engine may, for example, utilize term matching to determine the confidence score for the candidate synonym pair ($X_0$, $C_0$). For example, the confidence score may reflect the number of terms that appear in both definitions. One skilled in the art will appreciate that other NLP techniques (such as word position, n-gram analysis, expansion of common English language (or other language) synonyms, abbreviation expansion, etc.) may be used in lieu of, or in addition to, term matching.

The pre-selection technique 500 then determines whether the initial candidate term $C_0$ (or the then current candidate term $C_{(0 \ldots (n-1))}$) is the last candidate term $C_{n-1}$ (step 510).

If the initial candidate term $C_0$ (or the then current candidate term $C_{(0 \ldots (n-1))}$) is not the last candidate term (step 510=No), the pre-selection technique 500 proceeds to increment to the next candidate term and returns to step 504 (step 512). For example, in the case of the initial candidate term $C_0$, the pre-selection technique 500 increments the candidate term to the next candidate term $C_1$.

If the initial candidate term $C_0$ (or the then current candidate term $C_{(0 \ldots (n-1))}$) is the last candidate term $C_{n-1}$ (step 510=Yes), the pre-selection technique 500 proceeds to step 514. The pre-selection technique 500 then determines whether the initial term $X_0$ (or the then current term $X_{(0 \ldots n)}$) is the last term $X_n$ (step 514).

If the initial term $X_0$ (or the then current term $X_{(0 \ldots n)}$) is not the last term $X_n$ (step 514=No), the pre-selection technique 500 proceeds to increment to the next term and returns to step 502 (step 516). For example, in the case of the initial term $X_0$, the pre-selection technique 500 increments the term to the next term $X_1$.

If the initial term $X_0$ (or the then current term $X_{(0 \ldots n)}$) is the last term $X_n$ (step 514=Yes), the pre-selection technique 500 proceeds to step 518. The pre-selection technique 500 continues by ranking and sorting the confidence scores for each candidate synonym pair (step 518). For example, the method 300 may rank and sort the confidence scores so that the candidate synonym pairs are listed in the order of their confidence scores from the highest confidence scores to the lowest confidence scores.

The pre-selection technique 500 ends by filtering out bad matches based on the confidence scores for each candidate synonym pair (step 520). For example, the pre-selection technique 500 may employ a threshold to filter out bad matches. That is, candidate synonym pairs may be discarded in step 520 that have low confidence scores (i.e., reflecting no or few terms appear in both definitions).

Figure 6:
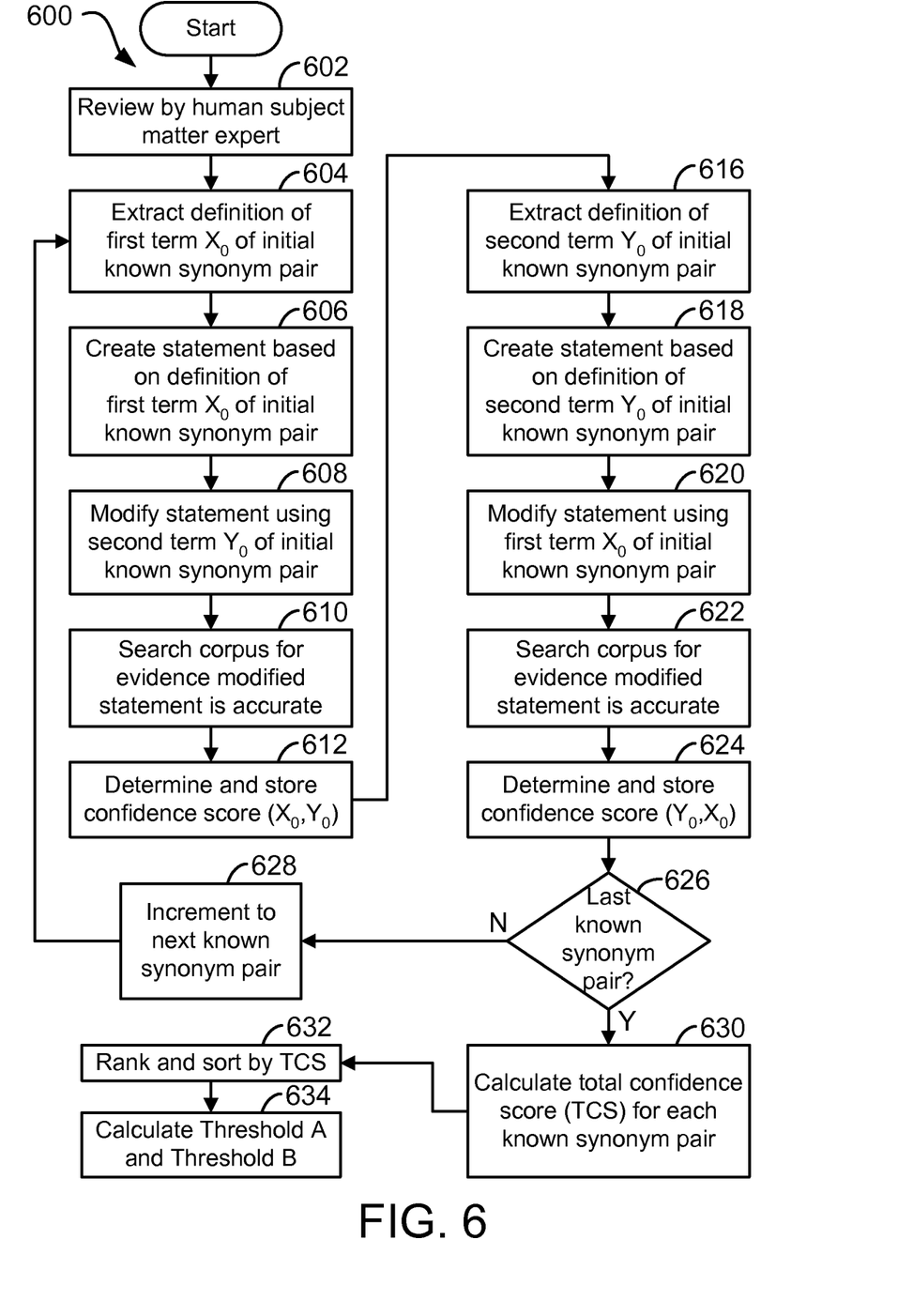
FIG. 6 is a flow diagram illustrating a machine learning technique for calculating thresholds that may be utilized in the method illustrated in FIG. 3 in accordance with some embodiments of the present invention.

FIG. 6 is a flow diagram illustrating a machine learning technique 600 for calculating thresholds that may be utilized in the method illustrated in FIG. 3 in accordance with some embodiments of the present invention. In the machine learning technique 600, the steps discussed below (steps 602-634) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The machine learning technique 600 begins by accessing a list of known synonym pairs (and known non-synonym pairs) of terms defined in a subject matter glossary (step 602). For example, the list of known synonym pairs (and known non-synonym pairs) may be provided by a human subject matter expert after review of terms defined in the subject matter glossary.

The machine learning technique 600 continues by extracting a definition of a first term $X_0$ of an initial known synonym pair ($X_0$, $Y_0$) from the subject matter glossary (step 604).

Next, the machine learning technique 600 creates a statement that contains the first term $X_0$ of the initial known synonym pair and that is based on the definition of the first term $X_0$ (step 606).

The machine learning technique 600 then modifies the statement using the second term $Y_0$ of the initial known synonym pair ($X_0$, $Y_0$) from the subject matter glossary (step 608). The synonym creation mechanism may, for example, extract the second term of the initial known synonym pair from the subject matter glossary and modify the statement created in step 606 by substituting the second term $Y_0$ of an initial known synonym pair for the first term $X_0$ of an initial known synonym pair.

The machine learning technique 600 then searches a corpus for evidence the modified statement (created in step 608) is accurate (step 610). For example, the synonym creation mechanism may pass the modified statement to the DeepQA engine, which then searches the Data and Information Repositories for evidence the modified statement is accurate. The DeepQA engine may, for example, search the Data and Information Repositories for passages that include terms present in the modified statement.

The machine learning technique 600 then determines and stores a confidence score ($X_0$, $Y_0$) for the initial known synonym pair based on evidence (found in step 610) the modified statement is accurate (step 612). For example, the DeepQA engine may calculate a confidence score (e.g., a final PTM score) for the initial known synonym pair and pass the confidence score to the synonym creation mechanism, which then stores the confidence score. The DeepQA engine may, for example, utilize Passage Term Match (PTM) to determine the confidence score for the initial known synonym pair. For example, the DeepQA engine may calculate a PTM score for each passage that reflects how many terms are matched between the passage and the modified statement, and then compute a final PTM score as a weighted sum over the set of highest-ranked passages. One skilled in the art will appreciate that other NLP techniques (such as lexical match, syntactic match, etc.) may be used in lieu of, or in addition to, PTM.

The machine learning technique 600 then extracts a definition of a second term $Y_0$ of the initial known synonym pair ($X_0$, $Y_0$) from the subject matter glossary (step 616).

Next, the machine learning technique 600 creates a statement that contains the second term $Y_0$ of the initial known synonym pair and that is based on the definition of the second term $Y_0$ (step 618).

The machine learning technique 600 then modifies the statement using the first term $X_0$ of the initial known synonym pair ($X_0$, $Y_0$) from the subject matter glossary (step 620). The synonym creation mechanism may, for example, extract the first term of the initial known synonym pair from the subject matter glossary and modify the statement created in step 618 by substituting the first term $X_0$ of an initial known synonym pair for the second term $Y_0$ of an initial known synonym pair.

The machine learning technique 600 then searches a corpus for evidence the modified statement (created in step 620) is accurate (step 622). For example, the synonym creation mechanism may pass the modified statement to the DeepQA engine, which then searches the Data and Information Repositories for evidence the modified statement is accurate. The DeepQA engine may, for example, search the Data and Information Repositories for passages that include terms present in the modified statement.

The machine learning technique 600 then determines and stores a confidence score ($Y_0$, $X_0$) for the initial known synonym pair based on evidence (found in step 622) the modified statement is accurate (step 624). For example, the DeepQA engine may calculate a confidence score (e.g., a final PTM score) for the initial known synonym pair and pass the confidence score to the synonym creation mechanism, which then stores the confidence score. The DeepQA engine may, for example, utilize Passage Term Match (PTM) to determine the confidence score for the initial known synonym pair. For example, the DeepQA engine may calculate a PTM score for each passage that reflects how many terms are matched between the passage and the modified statement, and then compute a final PTM score as a weighted sum over the set of highest-ranked passages. One skilled in the art will appreciate that other NLP techniques (such as lexical match, syntactic match, etc.) may be used in lieu of, or in addition to, PTM.

The machine learning technique 600 then determines whether the initial known synonym pair (or the then current known synonym pair) is the last known synonym pair (step 626).

If the initial known synonym pair (or the then current known synonym pair) is not the last known synonym pair (step 626=No), the machine learning technique 600 proceeds to increment to the next known synonym pair and returns to step 604 (step 628).

If the initial known synonym pair (or the then current known synonym pair) is the last known synonym pair (step 626=Yes), the machine learning technique 600 proceeds to step 630. The machine learning technique 600 then calculates a total confidence score (TCS) for each known synonym pair (step 630). For example, the machine learning technique 600 may calculate a TCS for each known synonym pair by combining confidence scores determined in steps 612 and 624 (e.g., TCS=confidence score ($X_0$, $Y_0$)+confidence score ($Y_0$, $X_0$); that is, the sum of the confidence score determined in step 612 when the first term $X_0$ is substituted in the definition of the second term $Y_0$ and the confidence score determined in step 624 when second term $Y_0$ is substituted in the definition of the first term $X_0$.)

Steps 604-630 may be repeated for the known non-synonym pairs of terms defined in the subject matter glossary.

The machine learning technique 600 continues by ranking and sorting the TCS for each known synonym pair (and each known non-synonym pair) (step 632). For example, the machine learning technique 600 may rank and sort the total confidence scores so that the known synonym pairs (and the known non-synonym pairs) are listed in the order of their TCS from the highest TCS to the lowest TCS.

The machine learning technique 600 ends by calculating threshold_A and threshold_B based on the TCS for each known synonym pair (and each known non-synonym pair) (step 634). For example, the machine learning technique 600 may calculate threshold_A as the lowest TCS of the known synonym pairs and may calculate threshold_B as the median TCS of the known non-synonym pairs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that many variations are possible within the scope of the present invention. Thus, while the present invention has been particularly shown and described with reference to particular embodiments thereof, it will be understood by those skilled in the art that these and other changes in form and detail may be made therein without departing from the spirit and scope of the present invention.

What is claimed is:

1. A computer-implemented method for creating subject matter synonyms from definitions of terms defined in a subject matter glossary, comprising:
    extracting from a subject matter glossary definitions of terms defined in the subject matter glossary, wherein extracting from a subject matter glossary definitions of terms defined in the subject matter glossary includes:
        extracting from the subject matter glossary a definition of a first term defined in the subject matter glossary;
    determining a plurality of confidence scores by applying natural language processing to the definitions extracted from the subject matter glossary, wherein each confidence score represents a likelihood that two terms defined in the subject matter glossary are synonyms, wherein determining a plurality of confidence scores by applying natural language processing to the definitions extracted from the subject matter glossary includes:
        creating a first statement, wherein the first statement contains the first term and is based on the definition of the first term extracted from the subject matter glossary;
        creating a modified first statement by substituting in the first statement a second term in lieu of the first term, wherein the second term is defined in the subject matter glossary;
        searching in a corpus for evidence that the modified first statement is accurate; and
        determining a total confidence score based on evidence in the corpus that the modified first statement is accurate; and
    building a subject matter thesaurus based on the confidence scores, wherein building a subject matter thesaurus based on the confidence scores includes:
        marking the first term and the second term as synonyms if the total confidence score is greater than a first threshold.

2. The computer-implemented method as recited in claim 1, further comprising:
    selecting the first term and the second term as possible synonyms for review by a human subject matter expert if the total confidence score is greater than a second threshold, wherein the second threshold is less than the first threshold.

3. The computer-implemented method as recited in claim 1, wherein the first threshold is determined using machine learning.

4. The computer-implemented method as recited in claim 3, wherein the machine learning includes calculating a total confidence score for each of a plurality of known synonym pairs.

5. A computer-implemented method for creating subject matter synonyms from definitions of terms defined in a subject matter glossary, comprising:
    extracting from a subject matter glossary definitions of terms defined in the subject matter glossary, wherein extracting from a subject matter glossary definitions of terms defined in the subject matter glossary includes:
        extracting from the subject matter glossary a definition of a first term defined in the subject matter glossary; and
        extracting from the subject matter glossary a definition of a second term defined in the subject matter glossary;
    determining a plurality of confidence scores by applying natural language processing to the definitions extracted from the subject matter glossary, wherein each confidence score represents a likelihood that two terms defined in the subject matter glossary are synonyms, wherein determining a plurality of confidence scores by applying natural language processing to the definitions extracted from the subject matter glossary includes:
        creating a first statement, wherein the first statement contains the first term and is based on the definition of the first term extracted from the subject matter glossary;
        creating a modified first statement by substituting in the first statement the second term in lieu of the first term;
        searching in a corpus for evidence that the modified first statement is accurate;
        determining a first confidence score based on evidence in the corpus that the modified first statement is accurate;
        creating a second statement, wherein the second statement contains the second term and is based on the definition of the second term extracted from the subject matter glossary;
        creating a modified second statement by substituting in the second statement the first term in lieu of the second term;
        searching in the corpus for evidence that the modified second statement is accurate;
        determining a second confidence score based on evidence in the corpus that the modified second statement is accurate;
        calculating a total confidence score based on the first confidence score and the second confidence score; and
    building a subject matter thesaurus based on the confidence scores, wherein building a subject matter thesaurus based on the confidence scores includes:
        marking the first term and the second term as synonyms if the total confidence score is greater than a first threshold.

6. A computer program product for creating subject matter synonyms from definitions of terms defined in a subject matter glossary, the computer program product comprising a non-transitory computer readable storage medium having program code embodied therewith, the program code executable by a processor to perform a method comprising:
    extracting from a subject matter glossary definitions of terms defined in the subject matter glossary, wherein extracting from a subject matter glossary definitions of terms defined in the subject matter glossary includes:
        extracting from the subject matter glossary a definition of a first term defined in the subject matter glossary;
    determining a plurality of confidence scores by applying natural language processing to the definitions extracted from the subject matter glossary, wherein each confidence score represents a likelihood that two terms defined in the subject matter glossary are synonyms, wherein determining a plurality of confidence scores by applying natural language processing to the definitions extracted from the subject matter glossary includes:
    creating a first statement, wherein the first statement contains the first term and is based on the definition of the first term extracted from the subject matter glossary;
    creating a modified first statement by substituting in the first statement a second term in lieu of the first term, wherein the second term is defined in the subject matter glossary;
    searching in a corpus for evidence that the modified first statement is accurate; and
    determining a total confidence score based on evidence in the corpus that the modified first statement is accurate; and
building a subject matter thesaurus based on the confidence scores, wherein building a subject matter thesaurus based on the confidence scores includes:
    marking the first term and the second term as synonyms if the total confidence score is greater than a first threshold.

7. The computer program product as recited in claim 6, further comprising;
    selecting the first term and the second term as possible synonyms for review by a human subject matter expert if the total confidence score is greater than a second threshold, wherein the second threshold is less than the first threshold.

8. The computer program product as recited in claim 6, wherein the first threshold is determined using machine learning.

9. The computer program product as recited in claim 8, wherein the machine learning includes calculating a total confidence score for each of a plurality of known synonym pairs.

10. A computer program product for creating subject matter synonyms from definitions of terms defined in a subject matter glossary, the computer program product comprising a non-transitory computer readable storage medium having program code embodied therewith, the program code executable by a processor to perform a method comprising:
    extracting from a subject matter glossary definitions of terms defined in the subject matter glossary, wherein extracting from a subject matter glossary definitions of terms defined in the subject matter glossary includes:
        extracting from the subject matter glossary a definition of a first term defined in the subject matter glossary; and
        extracting from the subject matter glossary a definition of a second term defined in the subject matter glossary;
    determining a plurality of confidence scores by applying natural language processing to the definitions extracted from the subject matter glossary, wherein each confidence score represents a likelihood that two terms defined in the subject matter glossary are synonyms, wherein determining a plurality of confidence scores by applying natural language processing to the definitions extracted from the subject matter glossary includes:
        creating a first statement, wherein the first statement contains the first term and is based on the definition of the first term extracted from the subject matter glossary;
        creating a modified first statement by substituting in the first statement the second term in lieu of the first term;
        searching in a corpus for evidence that the modified first statement is accurate;
        determining a first confidence score based on evidence in the corpus that the modified first statement is accurate;
        creating a second statement, wherein the second statement contains the second term and is based on the definition of the second term extracted from the subject matter glossary;
        creating a modified second statement by substituting in the second statement the first term in lieu of the second term;
        searching in the corpus for evidence that the modified second statement is accurate;
        determining a second confidence score based on evidence in the corpus that the modified second statement is accurate;
        calculating a total confidence score based on the first confidence score and the second confidence score; and
    building a subject matter thesaurus based on the confidence scores, wherein building a subject matter thesaurus based on the confidence scores includes:
        marking the first term and the second term as synonyms if the total confidence score is greater than a first threshold.

11. A computer system, comprising:
at least one processor;
a memory coupled to the at least one processor;
a synonym creation mechanism executed by one or more of the at least one processor to perform a method comprising:
    extracting from a subject matter glossary definitions of terms defined in the subject matter glossary, wherein extracting from a subject matter glossary definitions of terms defined in the subject matter glossary includes:
        extracting from the subject matter glossary a definition of a first term defined in the subject matter glossary;
    determining a plurality of confidence scores by applying natural language processing to the definitions extracted from the subject matter glossary, wherein each confidence score represents a likelihood that two terms defined in the subject matter glossary are synonyms, wherein determining a plurality of confidence scores by applying natural language processing to the definitions extracted from the subject matter glossary includes:
        creating a first statement, wherein the first statement contains the first term and is based on the definition of the first term extracted from the subject matter glossary;
        creating a modified first statement by substituting in the first statement a second term in lieu of the first term, wherein the second term is defined in the subject matter glossary;
        searching in a corpus for evidence that the modified first statement is accurate; and
        determining a total confidence score based on evidence in the corpus that the modified first statement is accurate; and
    building a subject matter thesaurus based on the confidence scores, wherein building a subject matter thesaurus based on the confidence scores includes:

marking the first term and the second term as synonyms if the total confidence score is greater than a first threshold.

12. The computer system as recited in claim 11, further comprising;
selecting the first term and the second term as possible synonyms for review by a human subject matter expert if the total confidence score is greater than a second threshold, wherein the second threshold is less than the first threshold.

13. The computer program product as recited in claim 11, wherein the first threshold is determined using machine learning.

14. A computer system, comprising:
at least one processor;
a memory coupled to the at least one processor;
a synonym creation mechanism executed by one or more of the at least one processor to perform a method comprising:
  extracting from a subject matter glossary definitions of terms defined in the subject matter glossary, wherein extracting from a subject matter glossary definitions of terms defined in the subject matter glossary includes:
    extracting from the subject matter glossary a definition of a first term defined in the subject matter glossary; and
    extracting from the subject matter glossary a definition of a second term defined in the subject matter glossary;
  determining a plurality of confidence scores by applying natural language processing to the definitions extracted from the subject matter glossary, wherein each confidence score represents a likelihood that two terms defined in the subject matter glossary are synonyms, wherein determining a plurality of confidence scores by applying natural language processing to the definitions extracted from the subject matter glossary includes:
    creating a first statement, wherein the first statement contains the first term and is based on the definition of the first term extracted from the subject matter glossary;
    creating a modified first statement by substituting in the first statement the second term in lieu of the first term;
    searching in a corpus for evidence that the modified first statement is accurate;
    determining a first confidence score based on evidence in the corpus that the modified first statement is accurate;
    creating a second statement, wherein the second statement contains the second term and is based on the definition of the second term extracted from the subject matter glossary;
    creating a modified second statement by substituting in the second statement the first term in lieu of the second term;
    searching in the corpus for evidence that the modified second statement is accurate;
    determining a second confidence score based on evidence in the corpus that the modified second statement is accurate;
    calculating a total confidence score based on the first confidence score and the second confidence score; and
  building a subject matter thesaurus based on the confidence scores, wherein building a subject matter thesaurus based on the confidence scores includes:
    marking the first term and the second term as synonyms if the total confidence score is greater than a first threshold.

* * * * *